(12) United States Patent
Keil et al.

(10) Patent No.: US 6,680,936 B2
(45) Date of Patent: Jan. 20, 2004

(54) DISTRIBUTED MULTIPLEXER

(75) Inventors: Ulrich Keil, Bronshoj (DK); Vagelis Tsakas, Kallithea-Athens (GR); George Souliotis, Patras (GR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/157,353

(22) Filed: May 28, 2002

(65) Prior Publication Data

US 2003/0042966 A1 Mar. 6, 2003

Related U.S. Application Data

(60) Provisional application No. 60/317,301, filed on Sep. 5, 2001.

(51) Int. Cl.[7] ............................................. H04L 12/56
(52) U.S. Cl. .................. 370/352; 370/427; 370/360; 370/366; 326/30; 327/374
(58) Field of Search .................... 326/30, 105; 370/352, 370/360, 366, 427, 60; 327/374, 427, 594, 595

(56) References Cited

U.S. PATENT DOCUMENTS

| | | | |
|---|---|---|---|
| 4,983,865 A | | 1/1991 | Ho et al. |
| 5,046,064 A | * | 9/1991 | Suzuki et al. ................ 370/414 |
| 5,440,550 A | * | 8/1995 | Follett ......................... 370/427 |
| 6,393,019 B1 | * | 5/2002 | Dobashi et al. ............. 370/352 |

OTHER PUBLICATIONS

IBM Technical Disclosure Bulletin, A. Davidson, S.M. Faris and H.C. Jones, "Time Domain Multiplexer–Driver and Receiver for Chip to Chip Communication", vol. 21 No. 11, Apr. 1979, pp 4705–4710.

* cited by examiner

*Primary Examiner*—Vibol Tan
(74) *Attorney, Agent, or Firm*—Fish & Richardson P.C.

(57) ABSTRACT

A digital multiplexer circuit includes an input transmission line structure receiving input signals, multiplexing blocks having input terminals that are successively coupled together by the input transmission line structure, and an output transmission line that successively couples output terminals of the multiplexing blocks and receives output signals from multiplexing blocks.

18 Claims, 1 Drawing Sheet

DISTRIBUTED MULTIPLEXER

This application claims the benefit of provisional application Ser. No. 60/317,301 filed Sep. 05, 2001.

TECHNICAL FIELD

This invention relates to distributed multiplexer.

BACKGROUND

The operating frequencies of electronic circuits for optical network applications are in the tens of gigahertz (GHz) range. Typically, the maximum operating frequency for a circuit is expected to be the half of the unity current gain frequency ($f_T$) of a semiconductor process used to fabricate devices. This maximum operating frequency is mainly limited by the output buffer that is loaded by the output termination.

DETAILED DESCRIPTION

Figure 1:
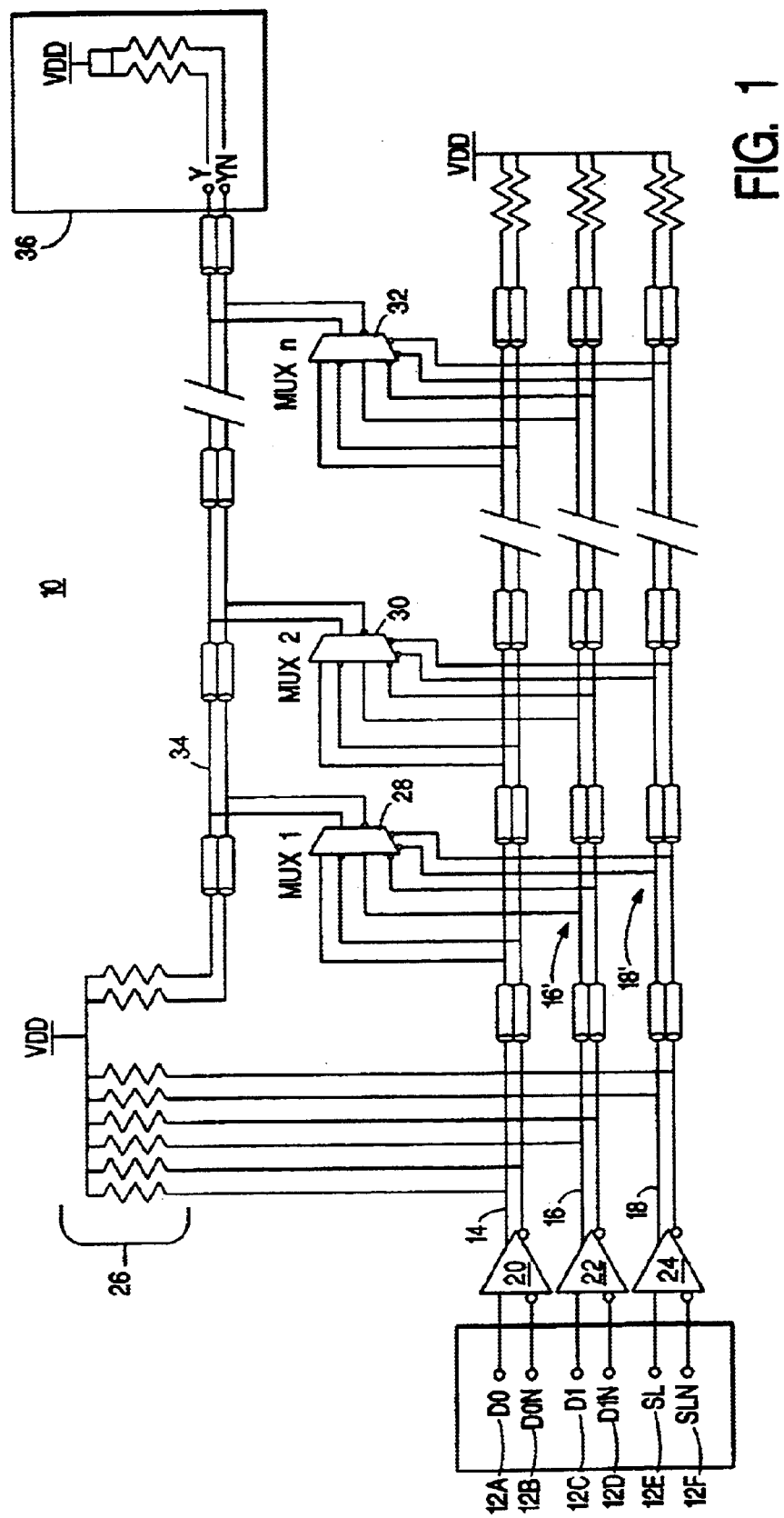
FIG. 1 is a block diagram of a circuit.

The FIG. 1 shows a distributed multiplexer circuit 10 having input data signals D0 12A, D0N 12B, D1 12C, D1N 12D, and input select signals SL 12E and SLN 12F, connected to input transmission lines 14, 16 and 18 through input buffers 20, 22 and 24. The circuit 10 also includes input termination resistors 26 and a plurality of multiplexing stages 28, 30, 32. An output transmission line 34 is coupled to a voltage supply VDD via resistors 26 and receives output signals from the multiplexing stages 28, 30 and 32. Transmission lines 14, 16, 18 can be of the lumped element type, i.e., implemented as inductors, but are preferably of the distributed type.

The input select signals SL 12E and SLN 12F provide, for example, a 20 gigahertz (GHz) signal, and switched between the two input data signals D0 12A and D1 12C. The inputs 12A–F are received by the input transmission lines 14, 16 and 18 through the buffers 20, 22 and 24, respectively.

The three buffers 20, 22 and 24 are circuits for the inputs 12A–F. The three buffers 20, 22, 24 provide the correct impedance. In an example, the buffers 20, 22, 24 have an open collector design with external termination resistors 26. In another example, the buffers 20, 22, 24 include resistors 26 internally. Output signals are transferred from the buffers 20, 22, 24 to the multiplexing stages 28, 30, 32.

The multiplexing stages 28, 30, 32 are time domain multiplexers with emitter followers. The multiplexing stages 28, 30, 32 use open collectors, like the buffers 20, 22, 24, at the outputs. The number n of the multiplexing stages 28, 30, 32 may vary from approximately three to approximately six. The number n of the multiplexing stages employed depends on a desired amplitude of the output signal. Outputs from each multiplexing stage 28, 30, 32 distributively adds a current in phase to output nodes 36, contributing to an output voltage produced at the nodes. In a preferred embodiment the transistors are Silicon Germanium Heterojunction Bipolar Transistors (SiGe HBTs).

The transmission lines 14, 16, 18 transfer the input signals 12A–F from the buffers 20, 22, 24 to the multiplexing stages 28, 30, 32 and the multiplexed signal to the output 36. The electrical path lengths through each of the multiplexing stages 28, 30, 32 to the output terminal are the same. In this manner the output signals 36 successively add in phase at the output. For optimal performance, the transmission lines 14, 16, 18 are characterized by an impedance that is higher than 50 Ω. A matching characteristic impedance of 50 Ω is achieved when the intrinsic capacitances associated with the transistors at the ports of the multiplexing stages 28, 30, 32 are taken into consideration as part of the impedance of the transmission line structure. Each of the transmission lines 14, 16, 18, 34 are implemented as two single-ended transmission lines. In other examples, each of the transmission lines 14, 16, 18, 34 may be implemented as one single-ended line or as one differential line. In a preferred embodiment the transmission lines 14, 16, 18, 34 are of the microstrip type.

The output impedance of the open collector buffers 20, 22 and 24 is determined by resistances of the termination resistors 26 and preferable matches the impedance of the input transmission lines 14, 16, 18 as well as input or intrinsic input reactance of the multiplexing stages 28, 30, 32. Generally, the input reactance of these multiplexing stages 28, 30, 32 is capacitive in nature. The input transmission lines 14, 16 and 18 have, for example, a 90 Ω characteristic impedance. The termination resistors 26 should have an impedance that matches the impedance of the input transmission lines 14, 16 and 18 together with input capacitances of the multiplexing stage stages 28, 30, 32. That is, the characteristic impedance of each of the input transmission lines 14, 16, 18, is chosen in combination with the intrinsic input capacitance of the multiplexing stage stages 28, 30, 32 to provide the overall input structures 14', 16', and 18' of the transmission lines 14, 16, 18 and the input capacitance of the multiplexing stage stages 28, 30, 32, with a desired, e.g., 50 Ω, characteristic impedance.

The 50 Ω impedance of the input network determines the load that the input data and clock buffers are driving. This provides the advantages that the input of the high power multiplexing stage can be driven sufficiently with on-chip buffers with a low voltage swing and half the data rate. The multiplexer output then drives the external load with a high voltage swing and the full data rate.

In one example, a SiGe bipolar technology with a unity gain current frequency $f_T=47$ GHz is used in the design of circuit 10. The maximum data rate that can be produced using a standard multiplexing stage topology is 30 Gb/s. Using circuit 10 extends this limit of the maximum data rate to greater than 40 Gb/s when three multiplexing stages 28, 30, 32 are used. The circuit 10 has a high output driving capability and provides a 50 Ω termination. Therefore, there is no need to employ a separate output buffer.

The circuit 10 provides a time division multiplexing stage topology that operates in an extended frequency range compared to standard multiplexing stage topologies. This reduces cost because multi-chip solutions are avoided. The circuit 10 includes n simple multiplexing stages in an open collector topology, matching networks connecting these multiplexing stages, open collector buffers and 50 Ω termination resistors at the inputs and outputs of the data, select and output signals.

Accordingly, the distributed digital multiplexing stage has the plurality of transmission line structures 14', 16', and 18'. The structures 14', 16', and 18' include intrinsic input reactances of the plurality of successively coupled multiplexing stage blocks. These blocks are cascade interconnected via first and second ones of the transmission lines for first and second input terminals. The blocks have clock terminals that are cascade interconnected via a third one of the transmission lines. The output terminals cascade is interconnected via a fourth one of the transmission lines.

The distributed digital multiplexing stage circuit has a overall transmission line structure having a characteristic impedance determined at least in part by an intrinsic input impedance of inputs of the multiplexing stage blocks together with that of the plurality of transmission lines.

Other digital logic devices for operation at these high frequencies could be provided. Accordingly, other embodiments are within the scope of the following claims.

What is claimed is:

1. A digital multiplexer circuit comprising:
   an input transmission line structure receiving input signals;
   multiplexing blocks having input terminals that are successively coupled together by the input transmission line structure;
   an output transmission line that successively couples output terminals of the multiplexing blocks and receives output signals from multiplexing blocks; and
   buffers having an open collector output stage coupled between the inputs of the multiplexing blocks and the transmission line structure, and which are terminated by the external termination resistors.

2. The circuit of claim 1 in which the input signals comprise:
   differential data input signals; and
   differential clock input signals.

3. The circuit of claim 1 in which the multiplexing blocks are time domain multiplexers.

4. The circuit of claim 1 in which an impedance of the external termination resistors matches an impedance of the transmission line structure, the transmission line structure including intrinsic input capacitances of the multiplexing blocks.

5. The circuit of claim 4 in which transistors at input ports of the multiplexing blocks and transistors at output ports of the multiplexing blocks have matching capacitances.

6. The circuit of claim 1 in which the input transmission line structure is characterized by impedance higher than approximately 50 Ω.

7. The circuit of claim 6 in which the impedance is 90 Ω.

8. A distributed multiplexer circuit comprising:
   a plurality of multiplexing blocks in an open collector topology;
   an input matching network connecting inputs of the multiplexing blocks, the input matching network terminated in 50 Ω termination resistors; and
   an output matching network connecting outputs of the multiplexing blocks, the output matching network terminated in 50 Ω termination resistors.

9. The circuit of claim 8 in which each of the multiplexing blocks comprise time domain multiplexers.

10. The circuit of claim 9 in which the time domain multiplexers include transistors at input ports and transistors at output ports having the same intrinsic capacitance.

11. The circuit of claim 8 further comprising:
    input buffers to receive differential input signals, the input buffers including open collector buffers, the open collector buffers providing differential buffered input signals to the input matching network; and
    wherein the input matching network comprises:
    a pair of input transmission lines to differentially transfer differential buffered input signals from the input buffers to the multiplexing blocks, the transmission lines characterized by an impedance higher than 50 Ω.

12. The circuit of claim 11 wherein the output matching network includes a pair of output transmission lines to receive differential output signals from the multiplexing blocks, the output transmission lines having a characteristic impedance of 50 Ω.

13. A distributed digital multiplexer circuit, comprising:
    a plurality of transmission line structures; and
    a plurality of successively coupled multiplexer blocks with the multiplexer blocks comprising at least a pair of inputs that are cascade interconnected via first and second ones of the transmission lines, a clock terminal cascade interconnected via a third one of the transmission lines and output terminals cascade interconnected via a fourth one of the transmission lines.

14. The distributed digital multiplexer circuit of claim 13 wherein a characteristic impedance of the plurality of transmission lines is determined at least in part by an intrinsic input impedance of inputs of the multiplexer blocks.

15. The distributed digital multiplexer circuit of claim 14 in which the characteristic impedance is higher than 50 Ω.

16. The distributed digital multiplexer circuit of claim 15 in which the characteristic impedance is approximately 90 Ω.

17. The distributed digital multiplexer circuit of claim 13 which each of the multiplexer blocks comprises transistors at input ports and transistors at output ports having matching capacitance.

18. The distributed digital multiplexer circuit of claim 13 further comprising a fifth transmission line structure, which along with the fourth transmission line structure differentially couple differential output signals from the multiplexer block to the output terminals.

* * * * *